US008396622B2

(12) United States Patent
Underdal et al.

(10) Patent No.: US 8,396,622 B2
(45) Date of Patent: Mar. 12, 2013

(54) CUSTOMIZABLE INITIATION OF DATA RECORDINGS

(75) Inventors: Olav M. Underdal, Kalamazoo, MI (US); Harry M. Gilbert, Portage, MI (US); Oleksiy Portyanko, Kalamazoo, MI (US); Randy L. Mayes, Otsego, MI (US); Gregory J. Fountain, Kalamazoo, MI (US); William W. Wittliff, III, Gobles, MI (US)

(73) Assignee: Service Solutions U.S. LLC, Warren, MI (US)

( * ) Notice: Subject to any disclaimer, the term of this patent is extended or adjusted under 35 U.S.C. 154(b) by 1122 days.

(21) Appl. No.: 12/108,159

(22) Filed: Apr. 23, 2008

(65) Prior Publication Data
US 2009/0271067 A1 Oct. 29, 2009

(51) Int. Cl.
*G01M 17/00* (2006.01)
*G06F 19/00* (2011.01)

(52) U.S. Cl. .............. 701/33.3; 701/29.1; 701/31.4; 701/32.9; 701/33.4; 701/34.2

(58) Field of Classification Search .............. 701/35, 701/29, 33, 31, 29.1, 31.4, 32.9, 33.3, 33.4, 701/34.2
See application file for complete search history.

(56) References Cited

U.S. PATENT DOCUMENTS

| 4,943,919 | A * | 7/1990 | Aslin et al. ............... 701/3 |
| 5,003,477 | A | 3/1991 | Abe et al. |
| 5,408,412 | A * | 4/1995 | Hogg et al. ............... 701/33 |
| 6,141,608 | A | 10/2000 | Rother |
| 7,184,866 | B2 * | 2/2007 | Squires et al. ............... 701/33 |
| 2003/0158640 | A1 * | 8/2003 | Pillar et al. ............... 701/33 |
| 2005/0203673 | A1 * | 9/2005 | El-Hajj et al. ............... 701/1 |
| 2006/0178792 | A1 * | 8/2006 | Ortiz et al. ............... 701/33 |
| 2007/0171029 | A1 * | 7/2007 | Inbarajan ............... 340/425.5 |
| 2007/0173993 | A1 * | 7/2007 | Nielsen et al. ............... 701/35 |
| 2007/0250228 | A1 * | 10/2007 | Reddy et al. ............... 701/29 |
| 2007/0288138 | A1 * | 12/2007 | Bodin et al. ............... 701/33 |
| 2008/0027606 | A1 * | 1/2008 | Helm ............... 701/33 |
| 2008/0249681 | A1 * | 10/2008 | Bertosa et al. ............... 701/35 |

* cited by examiner

*Primary Examiner* — Paul N Dickson
*Assistant Examiner* — George Spisich
(74) *Attorney, Agent, or Firm* — Baker Hostetler LLP

(57) ABSTRACT

A diagnostic system for a vehicle, includes a computer storing software on a computer readable media, configurable for setting up recording of vehicle operations, selecting from a plurality of customizable triggering operations according to Boolean logic, and a vehicle communication interface detachably connected to the computer, being setup by the computer for recording of vehicle operation while the vehicle is operating and recorded information stored in a computer readable media of the vehicle communication interface being reviewed by the computer, and detachably connected to the vehicle for recording of the vehicle operations.

24 Claims, 6 Drawing Sheets

CUSTOMIZABLE INITIATION OF DATA RECORDINGS

TECHNICAL FIELD

The present disclosure relates generally to diagnostic equipment and method thereof. More particularly, the present disclosure relates to customizable initiation of data recordings of vehicles.

BACKGROUND OF THE DISCLOSURE

Onboard control computers have become prevalent in motor vehicles, but as safety, economy, and emissions requirements have continued to tighten, vehicle systems and devices have not met the requirements set out in government regulations and the implicit demands of competitors' achievements. Successive generations of onboard control computers have acquired increasing data sensing and retention capability as the electronics have advanced.

Present external diagnostic and display apparatus, known as diagnostic tools, are commonly limited to reporting the data acquired by the onboard control computer itself. Increasingly, subtle subsystem failures in vehicles overload the ability of maintenance technicians, not simply to read the faults detected and stored by the diagnostic tools themselves, but to combine those readings with peripheral measurements and deduce corrective actions with both speed and accuracy.

Currently in the automotive industry, there are both stand alone and hand-held diagnostic testers or tools used in connection with motor vehicle maintenance and repair. For example, hand-held diagnostic tools have been used to trouble-shoot faults associated with vehicular control units. Diagnostic tools can detect faults based on Diagnostic Trouble Codes or DTCs that are set in the vehicle's onboard control computer. A DTC can be triggered and stored when there is a problem with the vehicle. A technician then retrieves the DTC using a diagnostic tool, repairs the associated problem and then deletes the DTC from the vehicle's computer.

Including and beyond diagnostic trouble codes, in general, diagnostic systems are used by technicians and professionals in virtually all industries to perform basic and advanced system testing functions. For example, in the automotive, trucking, heavy equipment and aircraft industries, diagnostic test systems provide for vehicle onboard computer fault or trouble code display as mentioned above, interactive diagnostics, multiscope and multimeter functions, and electronic service manuals. In the medical industry, diagnostic systems provide for monitoring body functions and diagnosis of medical conditions, as well as system diagnostics to detect anomalies in the medical equipment.

In many industries, diagnostic systems play an increasingly important role in manufacturing processes, as well as in maintenance and repair throughout the lifetime of the equipment or product. Some diagnostic systems are based on personal computer technology and feature user-friendly, menu-driven diagnostic applications. These systems assist technicians and professionals at all levels in performing system diagnostics on a real-time basis.

A typical diagnostic system includes a display on which instructions for diagnostic procedures are displayed. The system also includes a system interface that allows the operator to view real-time operational feedback and diagnostic information. Thus, the operator may view, for example, vehicle engine speed in revolutions per minute, or battery voltage during start cranking; or a patient's heartbeat rate or blood pressure. With such a system, a relatively inexperienced operator may perform advanced diagnostic procedures and diagnose complex operational or medical problems.

The diagnostic procedures for diagnostic systems of this sort are typically developed by experienced technical experts or professionals. The technical expert or professional provides the technical experience and knowledge required to develop complex diagnostic procedures. Thus, the efficacy of the diagnostic procedures, in particular the sequence in which the diagnostic procedures are performed, is highly dependent on the expertise of the technical expert or professional authoring the procedures.

In vehicle diagnostic tests, including the automotive vehicles, recording can be made while the vehicle is in operation and moving. The recordings of the vehicle operations can be triggered by manually turning on a button for recording or at the on-set of a DTC emitted by a vehicle electronic control unit. The recording of the vehicle operation are a useful tool in diagnostic the vehicles. However, there is a lack of control in the recording and therefore a reduction in the quality of the recording. There is a need to have an apparatus or system that can accommodate for a greater flexibility and accuracy in the recordings. There is also a need to have a more efficient manner of recording the vehicle operation.

SUMMARY OF THE DISCLOSURE

The foregoing needs are met, to a great extent, by the present disclosure, wherein one aspect a technique and apparatus are provided that will allow a technician to use a diagnostic system that provides a customizable initiation of data recordings of vehicles.

In an aspect of the present disclosure, a diagnostic system for a vehicle, includes a computer storing software on a computer readable media, configurable for setting up recording of vehicle operations, selecting from a plurality of customizable triggering operations according to Boolean logic, and a vehicle communication interface detachably connected to the computer, being setup by the computer for recording of vehicle operation while the vehicle is operating and recorded information stored in a computer readable media of the vehicle communication interface being reviewed by the computer, and detachably connected to the vehicle for recording of the vehicle operations.

The diagnostic system can include customizable initialization data recording operations including the types of measurements with a range of values connected with other customizable initialization data recording operations through the Boolean logic. The diagnostic system can also include the customizable initialization operations recorded on the computer readable media of the vehicle communication interface, including measurements of the vehicle health when operating the vehicle.

The diagnostic system can also include the customizable initialization operations recorded on the computer readable media of the vehicle communication interface, including diagnostic trouble codes and measurements of the vehicle parts. The diagnostic system can also include the vehicle communication interface comprising the computer readable media storing the recorded vehicle operation information being connected to a controller processing the recorded information for input and output to the computer for review.

The diagnostic system can include recording stored in the computer readable media of the vehicle communication interface being made in normal operation, potentially abnormal operation, and abnormal operation of the vehicle, where normal operation being according to a predetermined set of operating conditions. The diagnostic system can additionally include the customizable initialization operations including description of state characteristics of the vehicle including vehicle component status information during the operation. The diagnostic system can also include the selection of the customizable initialization operations when the vehicle enters at a potentially abnormal state of operation, where abnormal operation being when the vehicle operations are below a predetermined set of conditions.

In an other aspect of the disclosure, a method for a vehicle diagnostics, includes storing software on a computer readable media, configurable for setting up recording of vehicle operations, selecting from a plurality of customizable triggering operations according to Boolean logic, setting up for recording of the vehicle operations through the software, recording operational status information of the vehicle according to the selected triggering operations and Boolean logic, and extracting and reviewing the recorded information through the stored software.

In yet another aspect of the present disclosure, a diagnostic system for a vehicle, includes a means for computer storing software on a computer readable media, configurable for setting up recording of vehicle operations, selecting from a plurality of customizable triggering operations according to Boolean logic, and a means for vehicle communication interface detachably connected to the computer, being setup by the computer for recording of vehicle operation while the vehicle is operating and recorded information stored in a computer readable media of the vehicle communication interface being reviewed by the computer, and detachably connected to the vehicle for recording of the vehicle operations.

There has thus been outlined, rather broadly, certain embodiments of the disclosure in order that the detailed description thereof herein may be better understood, and in order that the present contribution to the art may be better appreciated. There are, of course, additional embodiments of the disclosure that will be described below and which will form the subject matter of the claims appended hereto.

In this respect, before explaining at least one embodiment of the disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

DETAILED DESCRIPTION

Figure 1:
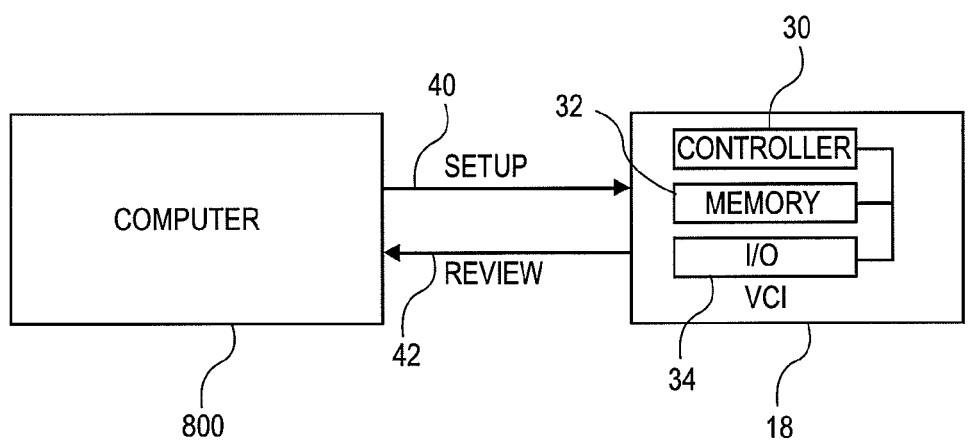
FIG. 1 is a diagram of a computer with a vehicle communication interface.

The disclosure will now be described with reference to the drawing figures, in which like reference numerals refer to like parts throughout. An embodiment in accordance with the present disclosure provides an apparatus and method that will allow a user, such as a technician, to use a computer or diagnostic equipment to generate a list of resources needed to complete a diagnostic test procedure or a repair.

In general, data recording is triggered by a DTC event or by a single event or value. In automotive diagnostics vehicle data recording, sometimes referred to as Flight Recording, can be obtained while the vehicle is in operation and moving. Such information from the vehicle data recording can be an important tool in diagnosing a fault. Such recording are commonly initiated either by manual intervention (depressing a button) or at the on-set of a diagnostic trouble code set by a vehicle electronic control unit.

The present disclosure allows for more flexible and timely initiation of data capture, which will increase the relevance and quality of the data captured, allowing for a faster and more reliable fault diagnosis. The customized settings accommodate a more focused recorded set of information. Instead of having to spend a high proportion of time trying to analyze a large set of recorded information, the data recording can be customized and a focused set of information can be more easily reviewed.

Referring, FIG. 1, a vehicle communication interface 18, used for recording of the vehicle operation can be first connected to a computer 800. There is software loaded in the computer that accommodates the customization of the recordings by the vehicle communication interface (VCI) 18.

Initiation of a test recording can extended with the following conditions. First, the vehicle state, as measured by the available diagnostic data stream, of a vehicle, engine, or other systems, can be in Normal (Green), Potentially Abnormal (Yellow), or Abnormal (Red) state. (Normal can be stated as being the vehicle operating at a predetermined range of operation.) The normal operation can also be changed depending on a condition or other factors, such as geography, climate, etc. The normal operation can also be defined as when a vehicle operates under certain predetermined optimal performance.

The present disclosure would allow triggering of a recording based on a selected state transition. For example, the user could select initiation of a test recording, whenever the vehicle entered a Yellow or Red state, or it could be set to only initiate when entering the Yellow state. This would allow for a much more general and granular selection of triggering criteria, than only triggering on the onset of any specific DTC. The setup of such factors as the general vehicle state can be made by the computer 800 sending setup instructions 40 to the vehicle communication interface 18. The signal can be sent through a wired or wirelessly connection.

Secondly, there can be customization based on using a systematic state description language, allowing for description of state characteristics such as Engine RPM, Gear selected etc. The specific set of measurements would allow the user to specify a specific triggering condition, such as, for example "when shifting into $2^{nd}$ gear" or "when shifted into 3rd gear and accelerating beyond 3000 RPM."

The specific instructions of state characteristics can be made by the setup instruction 40, which is sent to the vehicle communication interface 18 through the input/out port 34 of the vehicle communication interface. The instruction from the computer 800 is stored in the memory 32 and executed by the controller 30 for setting the conditions for initializing the recordings.

The recording device does not have to be a vehicle communication interface 18, but can be other devices that are capable of being customized for the initialization of the recordings. The recording device can also include the computer 800 with the vehicle communication interface 18 as an integrated unit.

Third, a combination of triggering conditions, such as for example: "In 3rd gear, accelerated past 4000 RPM (revolutions per minute), and the vehicle state becomes Yellow" can be selected through a user interface on the computer 800. Alternatively, the user interface can also be on the vehicle communication interface 18.

The present invention has a multidimensional approach, where there can be a plurality of issues taken into account. For example, there can be MAP volts less than 1.0, engine speed greater than 23000 rpm, and/or vehicle speed greater than 30 mph and/or $4^{th}$ gear, or the change in state from Yellow to Red. One can select Boolean operations such as AND/OR values in the trigger of the recording.

Therefore, if there is an explanation of the problem from a user to the technician, then the technician can select a plurality of conditions to trigger the event. As seen in FIG. 1, the set up the plurality of conditions or general conditions can be made. With the general condition of determining, such as the Yellow or Red states, the plurality of predetermined conditions involved is setup through the computer 800 and executed by the vehicle communication interface 18. For example, if the vehicle is in a Red state, the conditions can include the failure of the engine and/or electrical system of the vehicle. If the state is Yellow, then the conditions can include a plurality of conditions including the engine performance being a certain range and the electrical system being in a certain range. The plurality of conditions can be preset for the technician to select. Additionally, the technician can further modify the conditions involved in the different states, Yellow, Red and Green. States beyond the three states can also be customized and added during the setup 40 of the vehicle communication interface 18.

Figure 2:
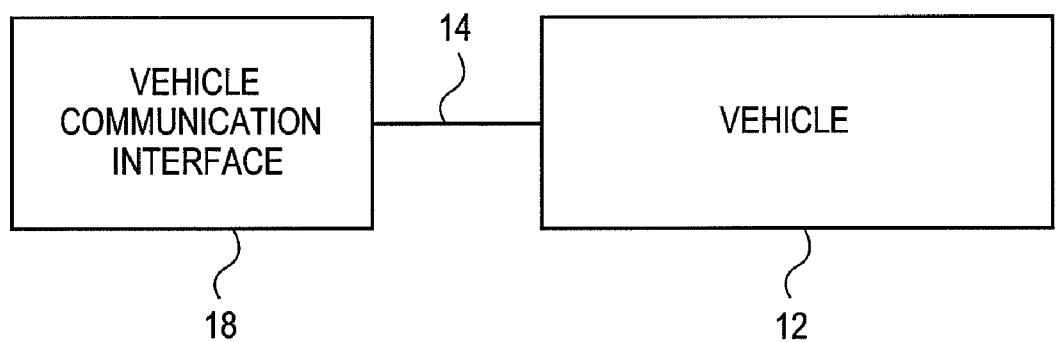
FIG. 2 is the vehicle communication interface connected to a vehicle.

Referring to FIG. 2, the vehicle communication interface 18 can be disconnected from the computer 800. Therefore, then the vehicle communication interface 18 is then connected to the vehicle 12 through a connection 14. The connection 14 can be wired or wireless. If the connection 14 is wired, the vehicle communication interface is placed on board the vehicle 12 while it is running. If the vehicle is stationary during the operation, then the VCI 18 does not have to be onboard the vehicle 12. Furthermore, if the connection 14 is wireless, then the VCI 18 can be onboard the vehicle 12 or not in the vehicle but communicating from a remote location, like a repair facility.

The VCI 18 can be setup as the road recording device for vehicle 12 via computer 800. If the customer states that that the problem occurs when it is accelerating at 30 mph and in the $4^{th}$ gear, then one can program those events into the trigger of the recording. Therefore, when those events occur with the VCI 18 connected to the vehicle 12, the recording will start. This will allow for a filtered recording that is focused at the problem in question. Much time is saved by reviewing the information as the data recording is limited to the specific problem conditions.

Additionally, if there is a certain degree of difference in the value of vehicle state, (Red, Yellow and Green), then the technician can look for something to look outside of Yellow in the state of health, border line, or greater than 1 or certain parameter set.

As seen in FIGS. 1-2, the Software is loaded on the personal computer 800, then the personal computer 800 is connected to the VCI 18, where the computer sets up the VCI 18 for a customized recording. Then, the VCI 18 is disconnected from the computer 800 and attached to the vehicle 12, so that the vehicle can be driven with the VCI 18. Then when the vehicle 12 with the VCI 18 comes back, the information can be reviewed by the computer 800. The VCI 18 is disconnected physically or the communication with the vehicle 12 is stopped. Then, the VCI 18 is reconnected to the computer 800 in order to review the recorded information that is gathered from the VCI 18. The review 42 is made through the extraction of the recorded information on the memory 32 of the VCI 18. The review is expedited by the fact the information recorded has already been limited to the specific problem in question, rather than have a variety of irrelevant information to sort through. The limited information that is recorded also helps to reduce cost in the manufacture of the VCI 18 as the memory 32 and the controller 30 are not overburdened by excessive recorded information. Further, less power is consumed by the focused recording.

Figure 3:
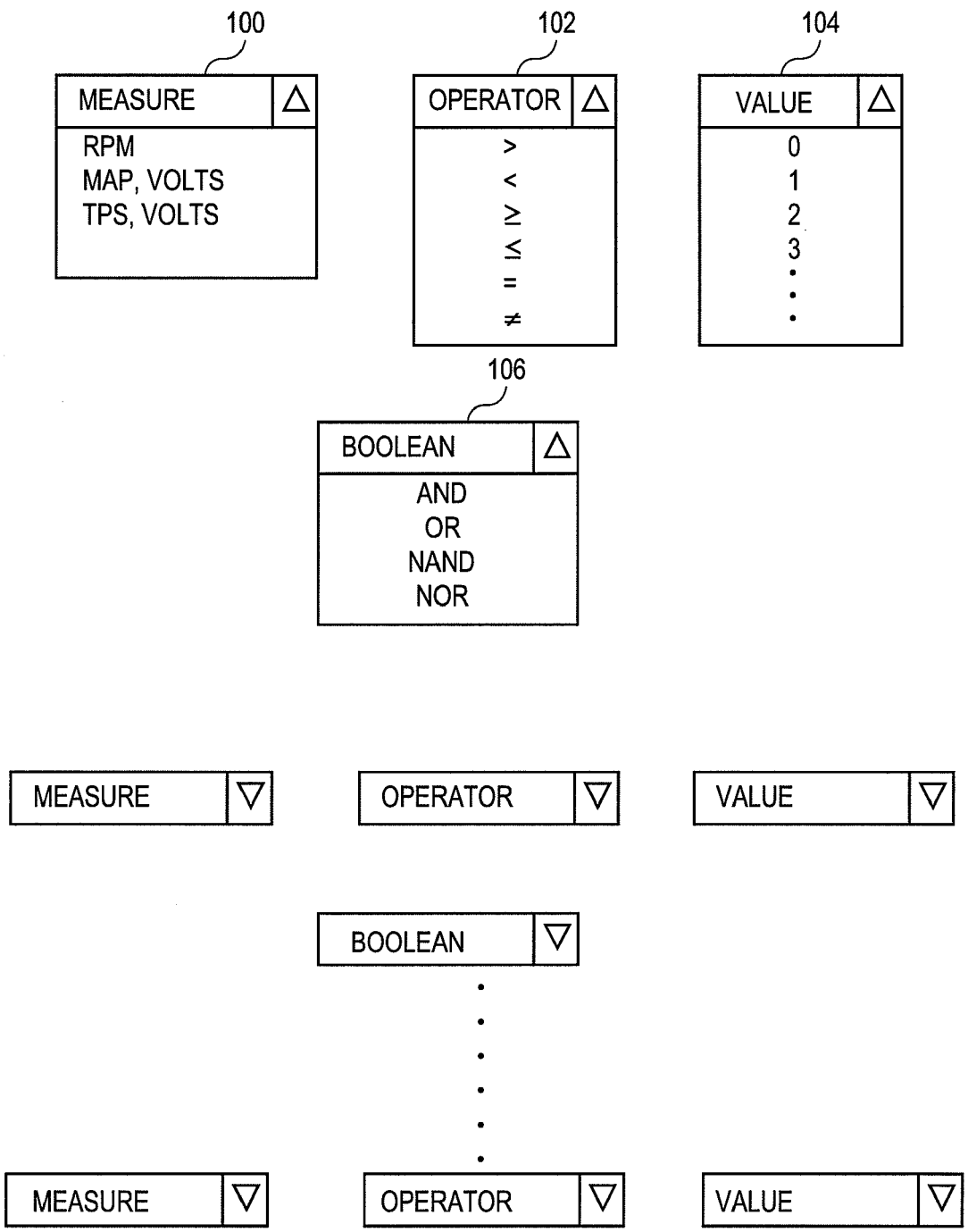
FIG. 3 is an example user interface including the multidimensional selection.
Figure 5:
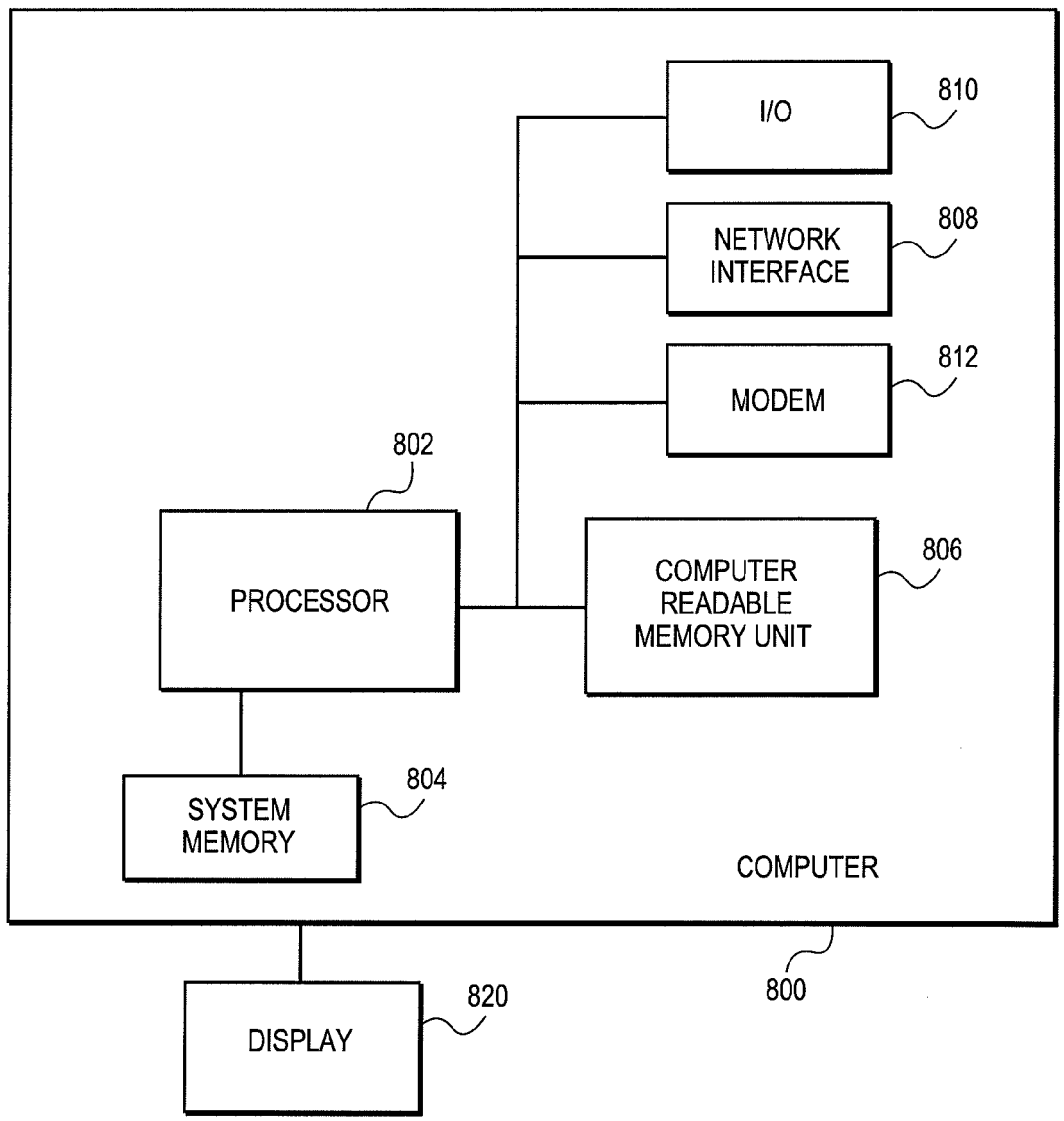
FIG. 5 is a block diagram of the computer of FIG. 1.

Referring to FIG. 3, the customizability will have prompts for the technician as seen in an example user interface that can be displayed on the display 820 of the computer 800 as seen in FIG. 5. For example, a plurality of menus can be displayed for selection by the user. The measurement can be selected with menu 100 by selecting options such as RPM, MAP (manifold absolute pressure sensor) volts, TPS (throttle position sensor) in volts. Options can also include general conditions of Green, Yellow, and Red and transitions thereof.

An operator 102 can be selected to select a range of values by selecting options such as equal to or greater than, etc. Then, the technician can select the value from menu 104 or a limited range of values with an additional value menu.

Then the technician can select a Boolean operator 106 such as AND, OR, etc. Thereafter, the additional set of measurements with ranges conditions can be selected. Therefore, a plurality of variables can be selected for initializing the recording of vehicle operation.

Figure 4:
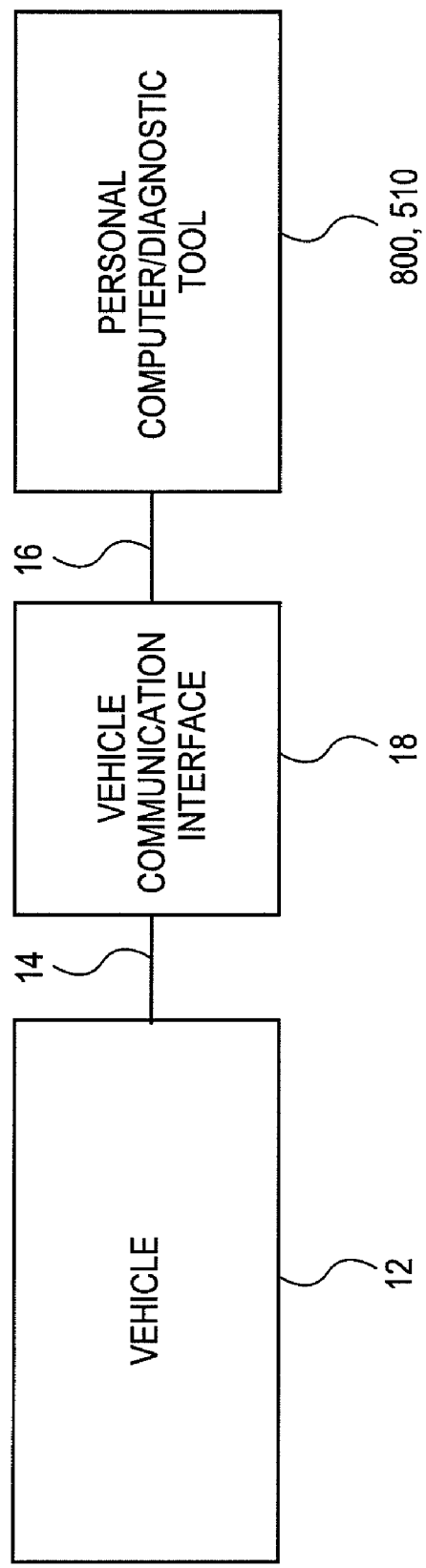
FIG. 4 is a block diagram including connections to computer or diagnostic tool, while connected to the vehicle.

Referring to FIG. 4, the setup and review can also be made through a diagnostic tool 510, in addition to the computer 800. The communication connection can be also kept between the vehicle 12, VCI 18 and computer 800 or diagnostic tool 510 during setup, recording of the data and review of the data. Such a connection can be kept if the connections are wireless or the operation of the vehicle 12 is stationary. The vehicle 12 is shown connected to a personal computer 800 or a dedicated diagnostic tool 510 via a vehicle communication interface 18. The first connection 14 between vehicle 12 and the vehicle communication interface 18, and the second connection 16 between the vehicle communication interface 18 and the personal computer/diagnostic tool 410 and 510 can be either wired or wireless.

Applicable communications with the host, such as the vehicle 12 connected to the unit, can be maintained during all functions of the vehicle during diagnostics. The connections 14 and 16 can include a wired connection such as through a RS232 port, USB (Universal Serial Bus), Ethernet cable. However, the connections 410 and 510 can also be wireless using protocols such as BLUETOOTH, IEEE 802.11x, wireless USB, other types of wireless Ethernet protocols, etc.

Referring to FIG. 5, an example of the computer 800 of FIG. 1, but not limited to this example of the computer 800, that can read computer readable media that includes computer-executable instructions of the disclosure. The computer 800 includes a processor 802 that uses the system memory 804 and a computer readable memory device 806 that includes certain computer readable recording media. A system bus connects the processor 802 to a network interface 808, modem 812 or other interface that accommodates a connection to another computer or network such as the Internet. The system bus may also include an input and output (I/O) interface 810 that accommodate connection to a variety of other devices. Furthermore, the computer 800 can output through, for example, the I/O 810, data for display on a display device 820.

The disclosure or parts thereof can be realized as computer-executable instructions in computer-readable media. The computer-readable media includes all possible kinds of media in which computer-readable data is stored or included or can include any type of data that can be read by a computer or a processing unit. The computer-readable media include for example and not limited to storing media, such as magnetic storing media (e.g., ROMs, floppy disks, hard disk, and the like), optical reading media (e.g., CD-ROMs (compact disc-read-only memory), DVDs (digital versatile discs), rewritable versions of the optical discs, and the like), hybrid magnetic optical disks, organic disks, system memory (read-only memory, random access memory), non-volatile memory such as flash memory or any other volatile or non-volatile memory, other semiconductor media, electronic media, electromagnetic media, infrared, and other communication media such as carrier waves (e.g., transmission via the Internet or another computer). Communication media generally embodies computer-readable instructions, data structures, program modules or other data in a modulated signal such as the carrier waves or other transportable mechanism including any information delivery media. Computer-readable media such as communication media may include wireless media such as radio frequency, infrared microwaves, and wired media such as a wired network. Also, the computer-readable media can store and execute computer-readable codes that are distributed in computers connected via a network. The computer readable medium also includes cooperating or interconnected computer readable media that are in the processing system or are distributed among multiple processing systems that may be local or remote to the processing system. The present disclosure can include the computer-readable medium having stored thereon a data structure including a plurality of fields containing data representing the techniques of the disclosure.

Figure 6:
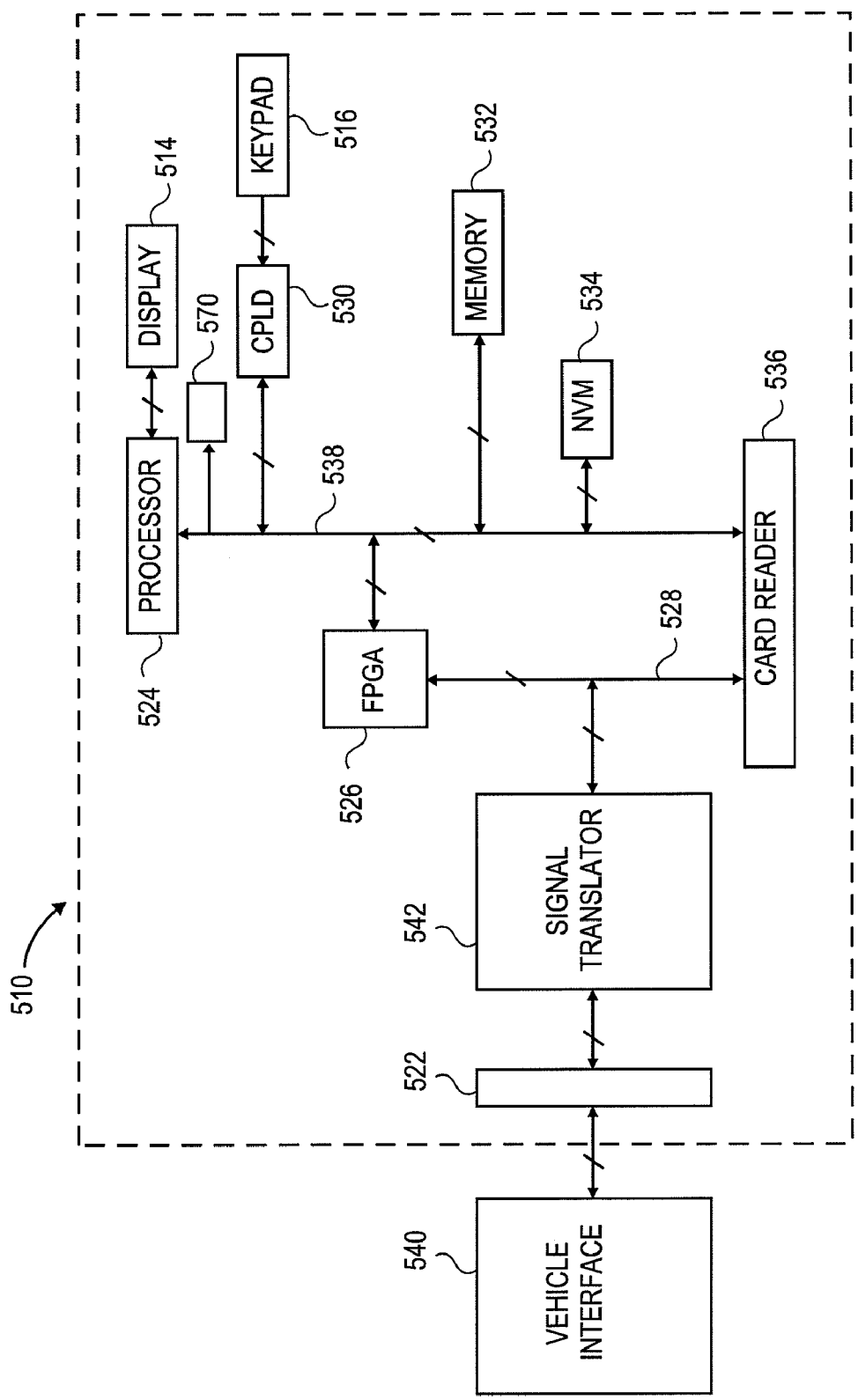
FIG. 6 is a block diagram of the diagnostic tool of FIG. 4

FIG. 6, shows the details of the diagnostic tool 510 of FIG. 1. The diagnostic tool can utilize the DTC's from the onboard computer, and/or check for the vehicle health information. FIG. 6 is a block diagram of the components of a diagnostic tool 510. The diagnostic tool 510, according to an embodiment of the disclosure, includes a processor 524, a field programmable gate array (FPGA) 526, a first system bus 528, the display 514, a complex programmable logic device (CPLD) 530, the user interface 516 in the form of a keypad, a memory subsystem 532, an internal non-volatile memory (NVM) 534, a card reader 536, a second system bus 538, the connector interface 522, and a selectable signal translator 542. A vehicle communication interface 540 is in communication with the diagnostic tool 510 through connector interface 522 via an external cable. The connection between the vehicle communication interface 540 and the connector interface 522 can also be a wireless connection such as BLUETOOTH, infrared device, wireless fidelity (WiFi, e.g. 802.11), etc.

The selectable signal translator 542 communicates with the vehicle communication interface 540 through the connector interface 522. The signal translator 542 conditions signals received from a motor vehicle control unit through the vehicle communication interface 540 to a conditioned signal compatible with the diagnostic tool 510. The translator 542 can communicate with, for example, the communication protocols of J1850 signal, ISO 9141-2 signal, communication collision detection (CCD) (e.g., Chrysler collision detection), data communication links (DCL), serial communication interface (SCI), S/F codes, a solenoid drive, J1708, RS232, controller area network (CAN), or other communication protocols that are implemented in a vehicle.

The circuitry to translate a particular communication protocol can be selected by the FPGA 526 (e.g., by ti-stating unused transceivers) or by providing a keying device that plugs into the connector interface 522 that is provided by diagnostic tool 510 to connect diagnostic tool 510 to vehicle communication interface 540. Translator 542 is also coupled to FPGA 526 and the card reader 536 via the first system bus 528. FPGA 526 transmits to and receives signals (i.e., messages) from the motor vehicle control unit through the translator 542.

FPGA 526 is coupled to the processor 524 through various address, data and control lines by the second system bus 538. FPGA 526 is also coupled to the card reader 536 through the first system bus 528. Processor 524 is also coupled to the display 514 in order to output the desired information to the user. The processor 524 communicates with the CPLD 530 through the second system bus 538. Additionally, the processor 524 is programmed to receive input from the user through the user interface 516 via the CPLD 530. The CPLD 530 provides logic for decoding various inputs from the user of diagnostic tool 510 and also provides the glue-logic for various other interfacing tasks.

Memory subsystem 532 and internal non-volatile memory 534 are coupled to the second system bus 538, which allows for communication with the processor 524 and FPGA 526. Memory subsystem 532 can include an application dependent amount of dynamic random access memory (DRAM), a hard drive, and/or read only memory (ROM). Software to run the diagnostic tool 510 can be stored in the memory subsystem 532. The internal non-volatile memory 534 can be, but not limited to, an electrically erasable programmable read-only memory (EEPROM), flash ROM, or other similar memory. The internal non-volatile memory 534 can provide, for example, storage for boot code, self-diagnostics, various drivers and space for FPGA images, if desired. If less than all of the modules are implemented in FPGA 526, the non-volatile memory 534 can contain downloadable images so that FPGA 526 can be reconfigured for a different group of communication protocols.

The customizable initialization settings displayed on the diagnostic tool 510 or personal computer 800 can be outputted with or without the connection to the vehicle. The vehicle specific information can be inputted manually or automatically through a wired or wireless connection. The setup or review of the vehicle communication interface can be made by other devices or be selected within the vehicles communication device itself.

Although examples of the diagnostic system providing customizable initiation of data recordings, other examples can also be made. For example, other types of initiations can be made, including modifications of the variables in the initiation and the different ways they can be customized. The device used for the recording does not have to be a vehicle communication device, but could be some other type of recording device, or even the computer or diagnostic tool itself. The recording device can also be within the vehicle itself.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A diagnostic system for a vehicle, comprising:
a computer storing software on a computer readable media, configurable for setting up recording of vehicle operations and selecting from a plurality of customizable initialization operations according to Boolean logic; and
a vehicle communication interface detachably connected to the computer, being setup by the computer for recording of vehicle operation while the vehicle is operating and recorded information stored in a computer readable media of the vehicle communication interface being reviewed by the computer, and detachably connected to the vehicle for recording of the vehicle operations.

2. The diagnostic system of claim 1, further comprised of the plurality of customizable initialization data recording operations including the types of measurements with a range of values connected with other customizable initialization data recording operations through the Boolean logic and changes of a state of vehicle from normal operation to abnormal operation.

3. The diagnostic system of claim 1, wherein the plurality of customizable initialization operations recorded on the computer readable media of the vehicle communication interface includes measurements of a vehicle health when operating the vehicle.

4. The diagnostic system of claim 1, wherein the plurality of customizable initialization operations recorded on the computer readable media of the vehicle communication interface includes diagnostic trouble codes and measurements of parts included in the vehicle.

5. The diagnostic system of claim 1, wherein the vehicle communication interface comprising the computer readable media storing the recorded vehicle operation information being connected to a controller processing the recorded information for input and output to the computer for review.

6. The diagnostic system of claim 1, wherein the recording stored in the computer readable media of the vehicle communication interface being made in normal operation, potentially abnormal operation, and abnormal operation of the vehicle, where normal operation being according to a predetermined set of operating conditions.

7. The diagnostic system of claim 1, wherein the plurality of customizable initialization operations includes description of state characteristics of the vehicle and includes vehicle component status information during the operation.

8. The diagnostic system of claim 1, wherein the selection of the plurality of customizable initialization operations when the vehicle enters at a potentially abnormal state of operation, and wherein abnormal operation being when the vehicle operations are below a predetermined set of conditions.

9. A method for vehicle diagnostics, comprising:
storing software on a computer readable media, configurable for setting up recording of vehicle operations;
selecting from a plurality of customizable initialization operations according to Boolean logic;
setting up for recording of the vehicle operations through the software;
recording operational status information of a vehicle according to selected triggering operations and Boolean logic; and
extracting and reviewing the recorded information through the stored software.

10. The method of claim 9, further comprised of the plurality of customizable initialization operations including types of measurements with a range of values connected with other customizable initialization operations through the Boolean logic.

11. The method of claim 9, wherein the plurality of customizable initialization operations recorded on a computer readable media of a vehicle communication interface includes measurements of a vehicle health when operating the vehicle.

12. The method of claim 9, wherein the plurality of customizable initialization operations recorded on a computer readable media of a vehicle communication interface includes diagnostic trouble codes and measurements of parts included in the vehicle.

13. The method of claim 9, wherein a vehicle communication interface comprising a computer readable media storing the recorded vehicle operation information being connected to a controller processing the recorded information for input and output to the computer for review.

14. The method of claim 9, wherein the recording stored in a computer readable media in a vehicle communication interface being made in normal operation, potentially abnormal operation, and abnormal operation of the vehicle, where normal operation being according to a predetermined set of operating conditions.

15. The method of claim 9, wherein the plurality of customizable initialization operations includes description of state characteristics of the vehicle and includes vehicle component status information during the operation.

16. The method of claim 9, wherein the selection of the plurality of customizable initialization operations when the vehicle enters a potentially abnormal state of operation, and wherein abnormal operation being when the vehicle operations are below a predetermined set of conditions.

17. A diagnostic system for a vehicle, comprising:
a means for computing that stores software on a computer readable media, configurable for setting up recording of vehicle operations, selecting from a plurality of customizable initialization operations according to Boolean logic; and
means for interfacing with a vehicle detachably connected to the computing means, being setup by the computing means for recording of vehicle operation while the vehicle is operating and recorded information stored in computer readable media of the interfacing means being reviewed by the computing means, and detachably connected to the vehicle for recording of the vehicle operation.

18. The diagnostic system of claim 17, further comprised of the plurality of customizable initialization operations including types of measurements with a range of values connected with other customizable initialization operations through the Boolean logic.

19. The diagnostic system of claim 17, wherein the plurality of customizable initialization operations recorded on the computer readable media of the interfacing means includes measurements of a vehicle health when operating the vehicle.

20. The diagnostic system of claim 17, wherein the plurality of customizable initialization operations recorded on the computer readable media of the interfacing means includes diagnostic trouble codes and measurements of parts included in the vehicle.

21. The diagnostic system of claim 17, wherein the interfacing means comprises the computer readable media storing the recorded vehicle operation information being connected to a controller processing the recorded information for input and output to the computing means for review.

22. The diagnostic system of claim 17, wherein the recording stored in the computer readable media of the interfacing means being made in normal operation, potentially abnormal operation, and abnormal operation of the vehicle, where normal operation being according to a predetermined set of operating conditions.

23. The diagnostic system of claim 17, wherein the plurality of customizable initialization operations including description of state characteristics of the vehicle and vehicle component status information during the operation.

24. The diagnostic system of claim 17, wherein the selection of the plurality of customizable initialization operations when the vehicle enters a potentially abnormal state of operation, and wherein abnormal operation being when the vehicle operations are below a predetermined set of conditions.

* * * * *